US012169619B2

(12) United States Patent
Srinivasan et al.

(10) Patent No.: US 12,169,619 B2
(45) Date of Patent: Dec. 17, 2024

(54) SYSTEM AND METHODS TO DENOTE UNSHARED CONTENT TO BE SHARED

(71) Applicant: Adeia Guides Inc., San Jose, CA (US)

(72) Inventors: Madhusudhan Srinivasan, Bangalore (IN); Aditya Rautray, Bangalore (IN); Deviprasad Punja, Bangalore (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/140,776

(22) Filed: Apr. 28, 2023

(65) Prior Publication Data

US 2023/0384908 A1    Nov. 30, 2023

Related U.S. Application Data

(63) Continuation of application No. 16/506,440, filed on Jul. 9, 2019, now Pat. No. 11,675,475.

(51) Int. Cl.
| | | |
|---|---|---|
| *G06F 3/048* | (2013.01) |
| *G06F 3/04817* | (2022.01) |
| *G06F 16/44* | (2019.01) |
| *G06F 16/487* | (2019.01) |
| *H04L 67/10* | (2022.01) |

(52) U.S. Cl.
CPC ........ *G06F 3/04817* (2013.01); *G06F 16/444* (2019.01); *G06F 16/487* (2019.01); *H04L 67/10* (2013.01)

(58) Field of Classification Search
CPC .. G06F 3/04817; G06F 16/487; G06F 16/444; H04L 67/10
See application file for complete search history.

(56) References Cited

U.S. PATENT DOCUMENTS

| | | | |
|---|---|---|---|
| 9,705,945 B1 | 7/2017 | Lewis et al. | |
| 11,159,629 B2 * | 10/2021 | Kumar | H04L 51/10 |
| 11,675,475 B2 * | 6/2023 | Srinivasan | G06Q 50/01 |
| | | | 715/751 |

(Continued)

FOREIGN PATENT DOCUMENTS

EP     2672484 A2    12/2013

OTHER PUBLICATIONS

PCT International Search Report for International Application No. PCT/US2020/041043, dated Nov. 2, 2020 (13 pages).

*Primary Examiner* — David Phantana-angkool
(74) *Attorney, Agent, or Firm* — Haley Guiliano LLP

(57) ABSTRACT

Methods and systems are described for identifying and marking content items that have or have not been shared to social media or content hosting services. The methods and systems use a marking engine to access a content item in a content library and identify the content hosts or social media sites to which the content item was previously transmitted. A marking engine may create a user interface, generate a thumbnail of each content item, and generate a graphical indicator for each identified content host. A marking engine may generate for display thumbnail representations of each content item with graphical indicators of each of the identified content hosts. A marking engine may sort thumbnails by metadata associated with the corresponding content items, such as creation time and date, location, share status, and other classifications and filters, to indicate which content items are ready to be shared to a content host.

20 Claims, 10 Drawing Sheets

(56) References Cited

U.S. PATENT DOCUMENTS

| | | | |
|---|---|---|---|
| 11,968,255 B2* | 4/2024 | Green | H04L 65/4046 |
| 2006/0020899 A1 | 1/2006 | Gusmorino et al. | |
| 2009/0307306 A1 | 12/2009 | Jalon et al. | |
| 2012/0017178 A1 | 1/2012 | Mulloy et al. | |
| 2012/0150971 A1 | 6/2012 | Bahrainwala et al. | |
| 2013/0097685 A1 | 4/2013 | Kennedy et al. | |
| 2013/0332831 A1 | 12/2013 | Birnkrant et al. | |
| 2013/0332856 A1 | 12/2013 | Sanders et al. | |
| 2014/0136635 A1 | 5/2014 | Jeng et al. | |
| 2014/0181747 A1 | 6/2014 | Son | |
| 2014/0195653 A1* | 7/2014 | Alexander | H04N 21/2181 |
| | | | 709/219 |
| 2014/0220943 A1 | 8/2014 | Yang et al. | |
| 2014/0267384 A1 | 9/2014 | Kwon et al. | |
| 2014/0280537 A1* | 9/2014 | Pridmore | H04L 51/52 |
| | | | 709/204 |
| 2015/0033150 A1 | 1/2015 | Lee et al. | |
| 2015/0177954 A1 | 6/2015 | Wei et al. | |
| 2015/0242443 A1* | 8/2015 | Grue | G06Q 50/01 |
| | | | 707/727 |
| 2015/0244794 A1* | 8/2015 | Poletto | G06F 16/51 |
| | | | 715/748 |
| 2016/0028782 A1 | 1/2016 | Kazan et al. | |
| 2016/0198017 A1 | 7/2016 | Alten | |
| 2017/0090699 A1 | 3/2017 | Pennington et al. | |
| 2017/0205987 A1* | 7/2017 | Martin | G06F 3/0482 |
| 2017/0310888 A1 | 10/2017 | Wright et al. | |
| 2017/0336922 A1 | 11/2017 | Vaskevitch et al. | |
| 2018/0091613 A1 | 3/2018 | Goel et al. | |
| 2018/0095653 A1* | 4/2018 | Hasek | G06F 3/04883 |
| 2018/0109732 A1 | 4/2018 | Jang et al. | |
| 2018/0124159 A1* | 5/2018 | Sun | G06Q 30/0201 |
| 2018/0181281 A1 | 6/2018 | Suki | |
| 2018/0373415 A1* | 12/2018 | Dellinger | G06F 3/0486 |
| 2019/0007722 A1 | 1/2019 | Strömberg et al. | |
| 2020/0042165 A1 | 2/2020 | Ji et al. | |
| 2020/0074008 A1 | 3/2020 | Delaney et al. | |
| 2020/0082851 A1 | 3/2020 | Chau et al. | |
| 2021/0011608 A1* | 1/2021 | Srinivasan | G06Q 50/01 |
| 2021/0117468 A1* | 4/2021 | Grue | G06F 16/9535 |
| 2022/0121349 A1* | 4/2022 | Dellinger | G06F 3/04842 |
| 2022/0405075 A1* | 12/2022 | Punja | G06F 8/62 |
| 2023/0384908 A1* | 11/2023 | Srinivasan | G06Q 10/10 |
| 2024/0155033 A1* | 5/2024 | Wei | A63F 13/537 |

\* cited by examiner

900

SYSTEM AND METHODS TO DENOTE UNSHARED CONTENT TO BE SHARED

CROSS-REFERENCE TO RELATED APPLICATION

This application is a continuation of U.S. patent application Ser. No. 16/506,440, filed Jul. 9, 2019, which is hereby incorporated by reference herein in its entirety.

BACKGROUND

The present disclosure relates to user interfaces, and more particularly to systems and related processes for identifying and displaying content items that have or have not been previously shared.

SUMMARY

Devices and users may share content and communicate with one another via social media, messaging applications, and content hosting services as a virtual extension of real-world interaction. Sharing content may include posting, uploading, messaging, streaming, recording, saving, sending and/or transmitting content for consumption. Operating systems and user interfaces of devices are designed to facilitate access and sharing of content and information, however, there are many platforms where content may be shared.

The sophistication and speed of content hosts and sharing services allow sharing of, for instance, photographs and videos in near real time via messaging and posts to social media services. Content such as images and movies, for example, can be transmitted one-to-one, to a group, or hosted on the internet for essentially anyone to see (and react to). Video clips with explanations and commentary may be uploaded or transmitted as a multimedia message or even, for example, posted as a story that automatically deletes after 48 hours. Live commentary of a game or sport may be recorded and uploaded to several hosts for later on-demand streaming. A new song might be shared with a trusted group on a password-protected website. Content like images, video, animation, music, audiobooks, playlists, podcasts, images, slideshows, games, text, and other media is easily created and shared.

Additionally, devices used to capture, store, and/or transmit digital content—e.g., servers, computers, telephones, smartphones, tablets, e-readers, voice-controlled devices, televisions, content delivery systems, video game consoles, and other internet-enabled devices and appliances—utilize advanced hardware with increased memory, faster processors, as well as efficient, high-bandwidth network connections, to allow near-instant uploads of multiple content items. While many devices come equipped with capturing hardware such as a camera and/or a microphone, external input peripherals may be easily configured for practically any device. With the speed and ease of creating, capturing, and uploading or sharing content, there may be difficulty in tracking which content items has been previously shared or uploaded.

There is a growing and ever-changing list of social media services, messaging services, and content hosts, such as Facebook, Instagram, Snapchat, WhatsApp, WeChat, QQ, Viber, Line, Telegram, Skype, Google Hangouts, Kik, iMessage, Android Messages, Dropbox, Box, OneDrive, YouTube, Vimeo, Vevo, Twitch, Dailymotion, Metacafe, Imgur, Google Photos, Unsplash, iCloud, and others, which may be generally referred to as "content hosts" and/or "sharing services."

With the ease of creating and sharing content to an increasing variety of services to share and consume such content, additional content is created and shared at an exponentially growing pace. A content creator may not be able to keep track of or easily identify what content has been previously shared. A content creator may miss sharing important content that has not been previously shared or risk redundantly sharing content that has already been shared.

One approach to facilitate sharing of created content might be to automatically upload each content item after it is created. While this may ensure that each content item is indeed uploaded, it may cause the uploading of private or personal content and expose it to public consumption. Such an approach may have a chilling effect on content creation, especially with private people. Even allowing such content to be viewed by selected friends or connections may risk exposure of private content and/or discourage content creation.

Even for a single user, keeping track of which created content has been shared to which social media services would require reviewing and double-checking at least a handful of different applications and websites. It is more efficient for a computer than a human to track the share status of a content item. Switching between applications and interfaces is not conducive to optimal sharing and risks over-sharing or exposing private content. Accordingly, current user interfaces do not identify if and where content items have been previously shared to allow for easy recognition and sharing of previously unshared content items.

A content creator may have shared a photograph to Instagram, which may automatically share the photograph to Facebook, but the content creator did not yet share that photograph to Twitter. A content creator may have created and shared a video clip with Snapchat and saved the clip to her personal library for potentially sharing to an Instagram story at a later time. A content sharer on a vacation may have taken 15 photographs and uploaded all 15 photos to WhatsApp and may then take another 10 photos and be unable to identify which of the 25 photographs were previously uploaded. There exists a need to mark or identify which content items have (or have not) been previously shared or uploaded to social media sites, sharing services, and content hosts.

One approach to facilitate sharing of created content may be to rely on the user, herself, to identify which photographs have been previously shared, perhaps by displaying thumbnails in a content library. Such an approach would require a user to view small thumbnails and recollect if the larger images were shared, as well as suboptimally depending on unreliable human memory. An approach may show a user a full-screen image to help the user recollect if such content was previously shared, but this is likely too inefficient when scrolling and trawling through a large content library, as well as relying on human memory.

One approach is to mark or identify content that has been previously uploaded within an application. A content host or cloud drive may identify, on files' icons, which locally stored files have been previously uploaded to the cloud service. Such an approach may not use a thumbnail and may not convey the content beyond filename, making it difficult to identify photos or videos with auto-generated or numeric filenames. Such an approach may automatically upload files as a back-up function and may not share content. Such an approach may over-share or expose private content items when uploading and/or sharing automatically. Such an approach may be limited to a single application and service and be incompatible with other hosts and services. Content hosts are typically competing for content, and visitors and are not eager to share directly with other content hosts. Such an approach may trigger additional privacy concerns with requiring access to personal content.

One approach to facilitate sharing of created content may be to sort or cluster content items in a content library interface, for instance, in order to identify when or where each photograph or video was captured. A user may be able to recollect, based on seeing date, time, or location information, if she previously shared the photo and determine if she wants to upload. Such an approach may improperly rely on unreliable human memory. Such an approach still does not provide information regarding sharing and may require accessing other interfaces and applications to find information regarding each content item's share status.

User interfaces may be able to switch between content libraries and multiple social media applications fairly simply, but current operating systems, applications, and user interfaces are not equipped to easily mark and identify which content items have been previously shared to social media or content hosts, especially when multiple content hosts are in play. Such a user interface would suboptimally rely on a user to remember which content items were previously shared, or to swap screens gratuitously in order to check and double-check multiple social media services and content hosts.

Methods and systems disclosed herein may use a marking engine to access a content item in a content library and identify the content hosts or social media sites to which the content item was previously transmitted. A marking engine may create a user interface, generate a thumbnail of each content item, and generate a graphical indicator for each identified content host. A marking engine may generate for display thumbnail representations of each content item with graphical indicators of each of the identified content hosts. A marking engine may sort thumbnails by metadata associated with the corresponding content items, such as creation time and date, location, share status, and other classifications and filters, to indicate which content items are ready to be shared to a content host.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
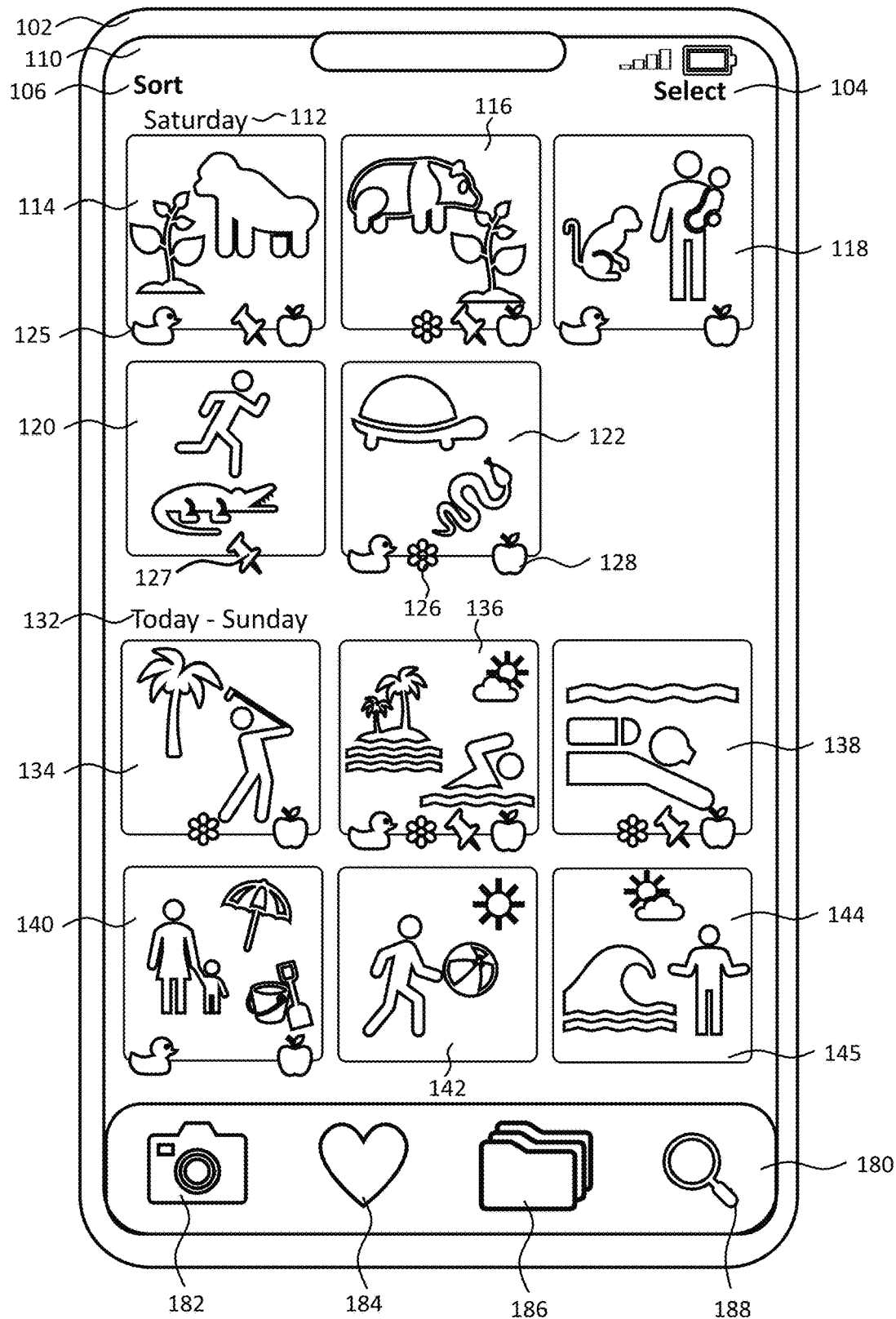
FIG. 1 depicts an illustrative scenario and interface for identifying and displaying content items that have or have not been previously shared, in accordance with some embodiments of the disclosure.

FIG. 1 depicts an illustrative scenario and interface for identifying and displaying content items that have or have not been previously shared, in accordance with some embodiments of the disclosure.

Figure 8:
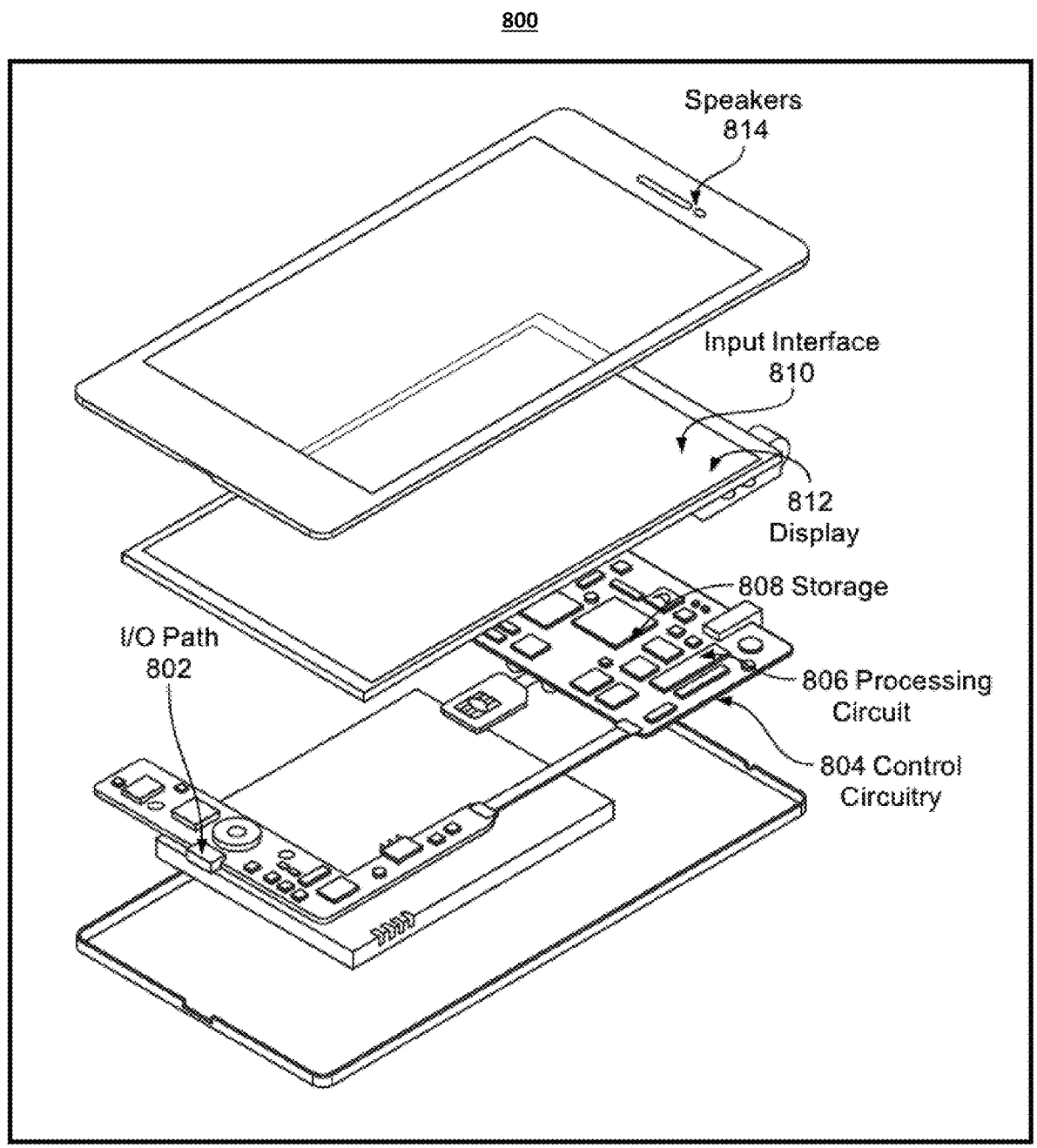
FIG. 8 is a diagram of an illustrative device, in accordance with some embodiments of the disclosure.
Figure 9:
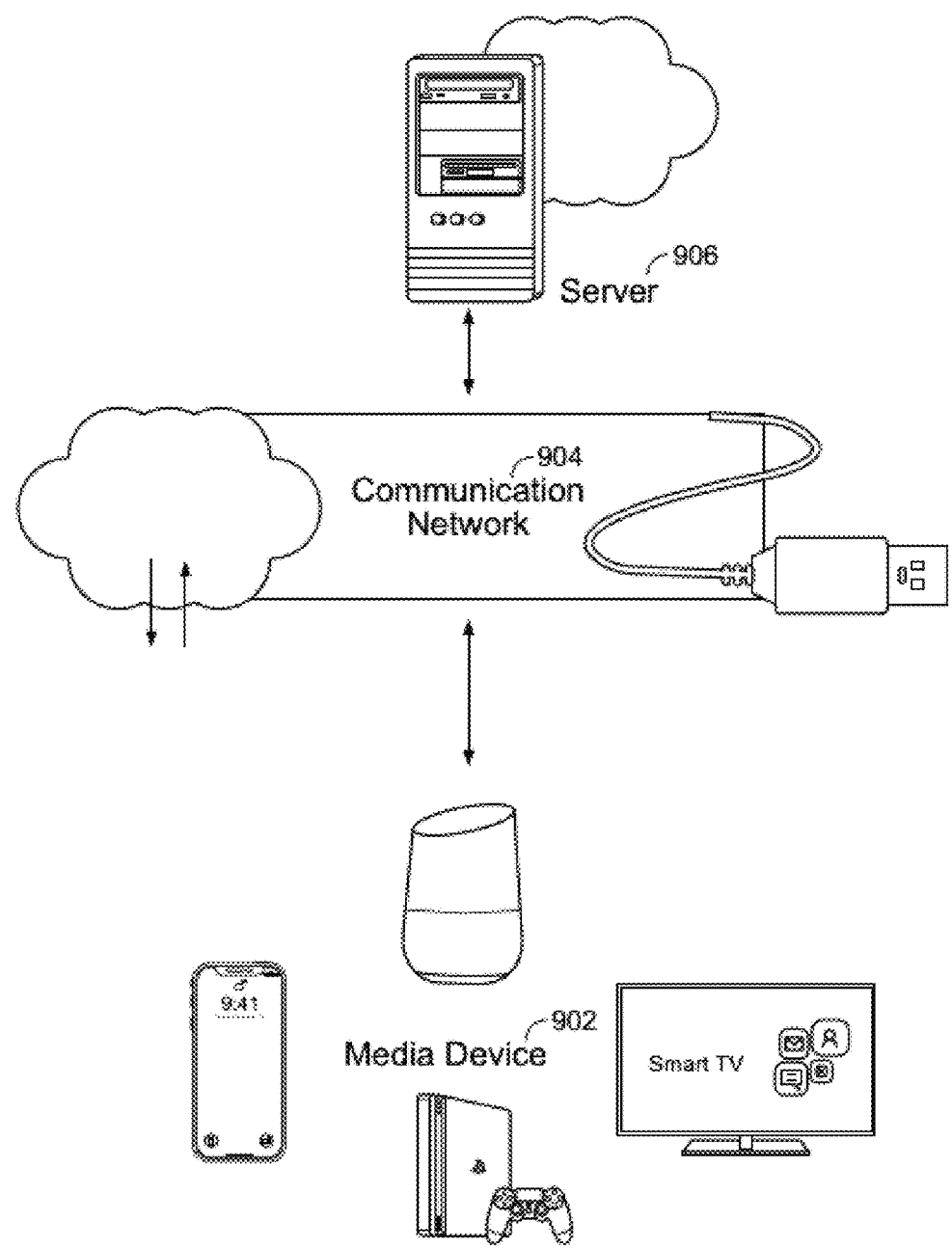
FIG. 9 is a diagram of an illustrative system, in accordance with some embodiments of the disclosure.

An exemplary embodiment is depicted in FIG. 1 as scenario 100 with smartphone 102. Smartphone 102 may be any other suitable device such as a personal computer, laptop, tablet, media center, video console, or any device as depicted in FIGS. 8 and 9.

Exemplary scenario 100 of FIG. 1 depicts an embodiment featuring exemplary thumbnails of content items with icons indicating to which social media or content hosting services each content item has been previously shared.

Scenario 100 features an exemplary display screen of smartphone 102 with a content thumbnail display interface depicted as user interface 110. User interface 110 depicts a content library accessible, for instance, via operating system, application, or application programming interface (API). User interface 110 may feature thumbnails to represent content, e.g., photographs, images, graphics, animation, movies, video, books, audio, etc. For simplicity, exemplary thumbnails 114, 116, 118, 120, 122, 134, 136, 138, 140, 142, and 144 may be considered to illustrate thumbnails representing photographs. Selecting or clicking a thumbnail may open a corresponding content item for a larger view or to play media, for example, as depicted as FIG. 3. Content (and thumbnails) may be created or stored locally and/or remotely, e.g., as depicted in FIGS. 8 and 9. Embodiments may store or display modified or compressed versions of content and thumbnails based on, e.g., file sizes, resolution, memory available, and network speeds.

User interface 110 may include thumbnails organized by metadata such as day or time. For instance, day label 112 indicates that content items (e.g., photographs) corresponding to thumbnails 114, 116, 118, 120, and 122 are from "Saturday" and day label 132 indicates that content items (e.g., photographs) corresponding to thumbnails 134, 136, 138, 140, 142, and 144 are from "Today—Sunday."

On each thumbnail depicted in user interface 110 may be shared status indicators to indicate to which content hosts each content item, corresponding to each thumbnail, was shared. Exemplary share services or content hosts are depicted as duck icon 125, flower icon 126, thumbtack icon 127, and fruit icon 128. For instance, duck icon 125 may identify a popular online news and social networking service on which a user may post and interact with posts of content and/or text. For instance, flower icon 126 may identify a popular online photo and video-sharing social networking service where users may post and interact with content and/or text. For instance, thumbtack icon 127 may identify a popular multimedia messaging application where users may create and post self-destructing photos, videos, and commentary to groups and individual users. For instance, fruit icon 128 may identify a popular cloud storage service used to store and share photographs, videos, albums, and other shareable media with permitted or invited users. An embodiment may feature more or fewer (and different combinations of) exemplary share services or content hosts such as those represented by duck icon 125, flower icon 126, thumbtack icon 127, or fruit icon 128.

An embodiment with user interface 110 may include thumbnails, such as thumbnails 114, 116, 118, 120, 122, 134, 136, 138, and 140, with shared status indicators to indicate to which content hosts each content item was shared. For instance, in scenario 100, thumbnail 114 is depicted with duck icon 125, thumbtack icon 127, and fruit icon 128 to indicate content associated with thumbnail 114 was previously uploaded or shared to content hosts corresponding to each of duck icon 125, thumbtack icon 127, and fruit icon 128. As thumbnail 114 is depicted as lacking flower icon 126, user interface 110 depicts that content associated with thumbnail 114 was not yet uploaded or shared to the content host corresponding to flower icon 126. Thumbnail 114 is depicted under day label 112 indicating "Saturday."

In scenario 100, thumbnail 140 is depicted with duck icon 125 and fruit icon 128 to indicate content associated with thumbnail 114 was previously uploaded or shared to content hosts corresponding to duck icon 125 and fruit icon 128. As thumbnail 140 is depicted as lacking flower icon 126 and thumbtack icon 127, user interface 110 depicts that content associated with thumbnail 140 was not yet uploaded or shared to the content hosts corresponding to flower icon 126 and thumbtack icon 127, respectively. Thumbnail 140 is depicted under day label 132 indicating "Today—Sunday."

In scenario 100, thumbnails 142 and 144 do not include any shared status indicators, as illustrated for thumbnail 144 by nothing depicted in shared status area 145. A lack of shared status indicators may indicate that the content corresponding to thumbnails lacking shared status indicators has yet to be shared (at least with the respective content hosts).

User interface 110 may include selectable options in dock 180 to switch to other interfaces such as capture 182, favorites 184, albums 186, or search 188. Other exemplary interfaces may incorporate one or more features of user interface 110 such as display of shared status indicators.

Embodiments of user interface 110 may include options such as Sort 106 or Select 104. A sort option, such as Sort 106, may facilitate sorting content and/or thumbnails by, for example, respective categories or metadata such as date, day, time, location, subject(s), people, colors, and/or other classifications and filters. Embodiments may use machine learning or other image processing to derive data for sorting characteristics and metadata.

Embodiments may sort, with Sort 106, by share status and/or services and hosts to where each content item was previously shared. Embodiments where content or thumbnails may be sorted by share status are demonstrated in FIGS. 4A and 4B.

Figure 2:
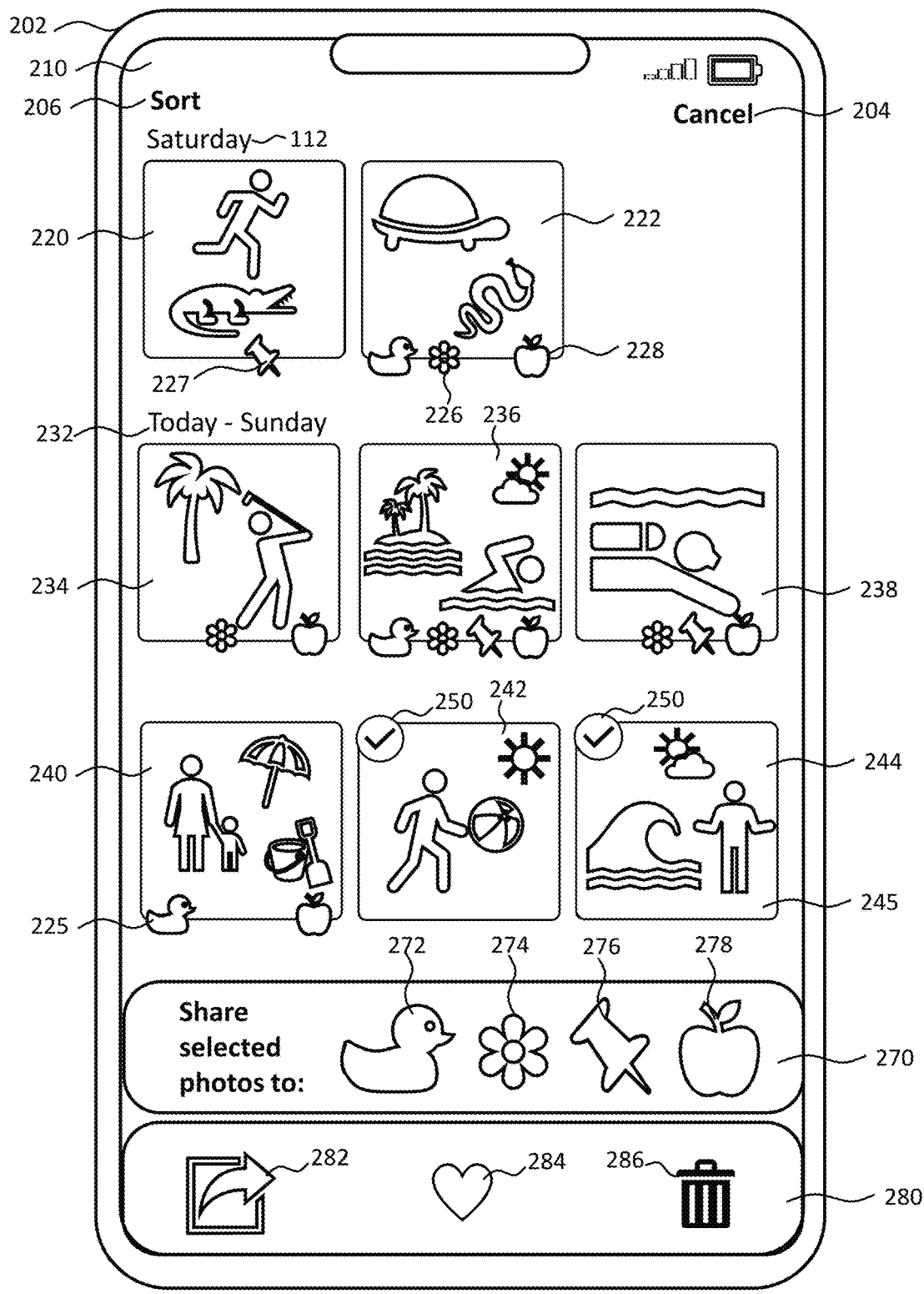
FIG. 2 depicts an illustrative scenario and interface for identifying and displaying content items that have or have not been previously shared, in accordance with some embodiments of the disclosure.

Some embodiments may use Select 104 to facilitate selecting of one or more content items or thumbnails in order to edit, delete, share, mark as favorite, etc., for example, as depicted in FIG. 2.

FIG. 2 depicts an illustrative scenario and interface for identifying and displaying content items that have or have not been previously shared, in accordance with some embodiments of the disclosure.

An exemplary embodiment is depicted in FIG. 2 as scenario 200 with smartphone 202. Smartphone 202 may be any other suitable device such as a personal computer, laptop, tablet, media center, video console, or any device as depicted in FIGS. 8 and 9.

Exemplary scenario 200 of FIG. 2 depicts an embodiment featuring exemplary thumbnails of content items with icons indicating to which social media or content hosting services each content item has been previously shared, as well as one or more content items selected to be shared, exported, deleted, or otherwise modified. Exemplary scenario 200 may occur, for example, after selection of Select 104 of scenario 100.

Scenario 200 features an exemplary display screen of smartphone 202 with a content thumbnail display interface depicted as user interface 210. User interface 210 may feature thumbnails to represent content, such as exemplary thumbnails 220, 222, 234, 236, 238, 240, 242, and 244 representing photographs.

User interface 210 may include thumbnails organized by metadata such as day or time. For instance, day label 212 indicates that content items (e.g., photographs) corresponding to thumbnails 220 and 222 are from "Saturday" and day label 232 indicates that content items (e.g., photographs) corresponding to thumbnails 234, 236, 238, 240, 242, and 244 are from "Today—Sunday."

On each thumbnail depicted in user interface 210 may be shared status indicators to indicate to which content hosts each content item, corresponding to each thumbnail, was shared. Exemplary share services or content hosts are depicted as duck icon 225, flower icon 226, thumbtack icon 227, and fruit icon 228. An embodiment may feature more or fewer (and different combinations of) exemplary share services or content hosts such as those represented by duck icon 225, flower icon 226, thumbtack icon 227, or fruit icon 228.

An embodiment with user interface 210 may include thumbnails, such as thumbnails 220, 222, 234, 236, 238, and 240, with shared status indicators to indicate to which content hosts each content item was shared. For instance, in scenario 200, thumbnail 222 is depicted with duck icon 225, flower icon 226, and fruit icon 228 to indicate content associated with thumbnail 222 was previously uploaded or shared to content hosts corresponding to each of duck icon 225, flower icon 226, and fruit icon 228. As thumbnail 222 is depicted as lacking thumbtack icon 227, user interface 210 depicts that content associated with thumbnail 222 was not yet uploaded or shared to the content host corresponding to thumbtack icon 227. Thumbnail 222 is depicted under day label 212 indicating "Saturday."

In scenario 200, thumbnails 242 and 244 do not include any shared status indicators, as illustrated for thumbnail 244 by nothing depicted in shared status area 245. A lack of shared status indicators may indicate that the content corresponding to thumbnails lacking shared status indicators has yet to be shared (at least with the respective content hosts). In scenario 200, thumbnails 242 and 244 each include a selection check 250 indicating that thumbnails 242 and 244 were selected. Embodiments may receive input for selection or deselection of thumbnails or, for example, may select specific thumbnails by default based on characteristics and metadata including recency and shared status (or lack of shared status indicators).

User interface 210 may include selectable options in share dock 270 to share or upload selected thumbnails to share services or content hosts such as those represented by duck share icon 272, flower share icon 274, thumbtack share icon 276, or fruit share icon 278, which each correspond to services related to, e.g., duck icon 225, flower icon 226, thumbtack icon 227, and fruit icon 228. For instance, by selecting flower share icon 274, content corresponding to thumbnails 242 and 244 (because each includes a selection check 250) would be shared or uploaded to a content host represented by flower share icon 274 (or flower icon 226). In an embodiment, thumbnails 220, 234, and 238 may be selected and uploaded to a content host with duck share icon 272 because thumbnails 220, 234, and 238 each lack duck icon 225. In an embodiment, thumbnails 222, 234, and 240 may be selected and uploaded to a content host with thumbtack share icon 276 because thumbnails 222, 234, and 240 each lack thumbtack icon 227.

User interface 210 may include selectable options in dock 280 to perform additional tasks with content corresponding to selected thumbnails such as export 282, designate as favorites 284, or delete 286, among others. Some embodiments may use Cancel 204 to end a selection process and return to a viewing user interface, for example, as depicted in scenario 100 of FIG. 1.

Figure 3:
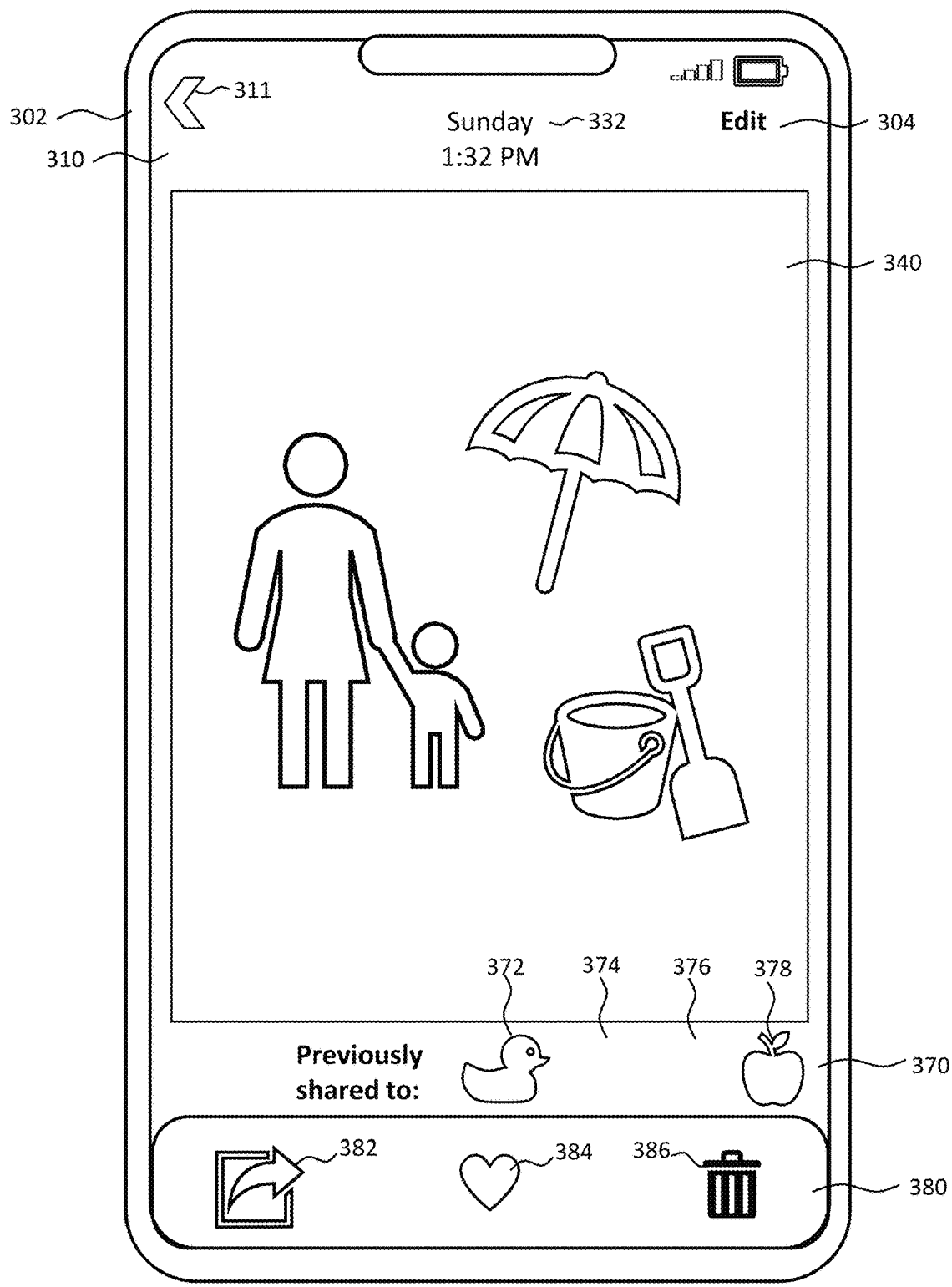
FIG. 3 depicts an illustrative scenario and interface for displaying a content item with indication of its share status in order to facilitate sharing, in accordance with some embodiments of the disclosure.

FIG. 3 depicts an illustrative scenario and interface for displaying a content item with indication of its share status in order to facilitate sharing, in accordance with some embodiments of the disclosure.

An exemplary embodiment is depicted in FIG. 3 as scenario 300 with smartphone 302. Smartphone 302 may be any other suitable device such as a personal computer, laptop, tablet, media center, video console, or any device as depicted in FIGS. 8 and 9.

Exemplary scenario 300 of FIG. 3 depicts an embodiment featuring an exemplary content item with icons indicating to which social media or content hosting services the content item has been previously shared, as well as options for content to be shared, exported, deleted, or otherwise modified. Exemplary scenario 300 may occur, for example, after selection of thumbnail 140 of scenario 100.

Scenario 300 features an exemplary display screen of smartphone 302 with a content display interface depicted as user interface 310. User interface 310 may feature content, such as exemplary content item 340. Embodiments may store or display modified or compressed versions of content and thumbnails based on, e.g., file sizes, resolution, memory available, and network speeds.

User interface 310 may include metadata for content item 340 such as day or time. For instance, day label 332 indicates that content item 340 is from "Sunday" and "1:32 PM." Embodiments of user interface 310 may include options such as back arrow 311 or edit 304. Back arrow 311 would take a user back to a prior screen, such as scenario 100. Edit 304 may allow a user to edit content, such as cropping an image, applying a filter to a photograph, or adding graphics or commentary to a video.

On or near content item 340 depicted in user interface 210 may be shared status indicators to indicate to which content hosts content item 340 was shared. Exemplary share services or content hosts for content item 340 are depicted as duck icon 372 and fruit icon 378. An embodiment may feature more or fewer (and different combinations of) exemplary share services or content hosts such as those represented by duck icon 372 and fruit icon 378, and may include, for instance, hosts represented by duck icon 125, flower icon 126, thumbtack icon 127, and/or fruit icon 128, from scenario 100 in FIG. 1.

In an embodiment, exemplary share services or content hosts for content item 340 will match thumbnail 140 of scenario 100 in FIG. 1, which is depicted with duck icon 125 and fruit icon 128 to indicate where corresponding content was previously uploaded or shared. Similar to thumbnail 140, scenario 300 depicts user interface 310 and content item 340 as lacking flower icon 126 and thumbtack icon 127 in, e.g., shared status slots 374 and 376. User interface 310 depicts that content item 340 was not yet uploaded or shared to the content hosts corresponding to, e.g., flower icon 126 or thumbtack icon 127.

User interface 310 may include selectable options in dock 380 to perform additional tasks with content corresponding to content item 340 such as export 382, designate as favorite 384, or delete 386, among others. In some embodiments, export 382 may trigger sharing of content item 340 to specified hosts, such as content hosts corresponding to, e.g., flower icon 126 or thumbtack icon 127 of scenario 100 in FIG. 1. Some embodiments may use back arrow 311 to end a content viewing process and return to a viewing user interface such as scenario 100 of FIG. 1.

Figure 4A:
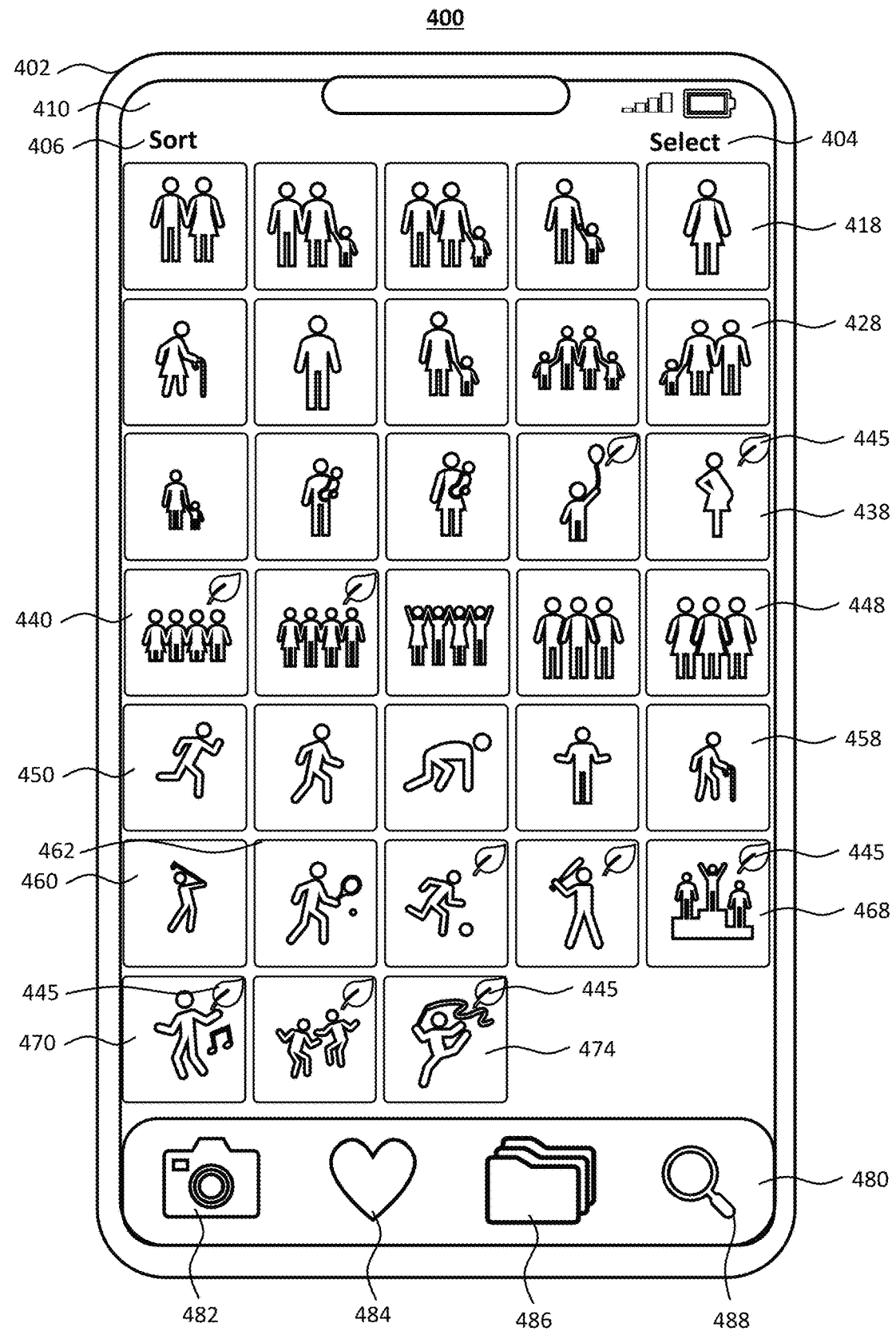
FIG. 4A depicts an illustrative scenario and interface for identifying and displaying content items that have or have not been previously shared, in accordance with some embodiments of the disclosure.

FIG. 4A depicts an illustrative scenario and interface for identifying and displaying content items that have or have not been previously shared, in accordance with some embodiments of the disclosure.

An exemplary embodiment is depicted in FIG. 4A as scenario 400 with smartphone 402. Smartphone 402 may be any other suitable device such as a personal computer, laptop, tablet, media center, video console, or any device as depicted in FIGS. 8 and 9.

Exemplary scenario 400 of FIG. 4A depicts an embodiment featuring exemplary thumbnails of content items with icons indicating whether or not each content item has been previously shared to a social media or content hosting service.

Scenario 400 features an exemplary display screen of smartphone 402 with a content thumbnail display interface depicted as user interface 410. User interface 410 depicts a content library accessible, for instance, via operating system, application, or application programming interface (API). User interface 410 may feature thumbnails to represent content, e.g., photographs, images, graphics, animation, movies, video, books, audio, etc. For simplicity, exemplary thumbnails 418, 428, 438, 440, 448, 450, 458, 460, 468, 470, and 474 may be considered to illustrate thumbnails representing photographs. Selecting or clicking a thumbnail may open a corresponding content item for a larger view or to play media, for example, as depicted as FIG. 3. Content (and thumbnails) may be created or stored locally and/or remotely, e.g., as depicted in FIGS. 8 and 9. Embodiments may store or display modified or compressed versions of content and thumbnails based on, e.g., file sizes, resolution, memory available, and network speeds.

User interface 410 of scenario 400 may include thumbnails organized by metadata such as day or time, e.g., progressing in time from left to right and top to bottom, with the most recent content item represented by thumbnail 474 farthest to the right in the bottom row. For example, scenario 400 also depicts content corresponding to thumbnail 468 as more recent than content corresponding to thumbnail 460, which is more recent than content corresponding to thumbnail 458. Likewise, in scenario 400, content corresponding to thumbnail 448 is more recent than content corresponding to thumbnail 440, which is more recent than content corresponding to thumbnail 438.

On several thumbnails depicted in user interface 410 may be shared status indicators to indicate to which content items, corresponding to each thumbnail, were or were not shared. In scenario 400, thumbnails 438, 440, 468, 470, and 474, among others, include leaf icon 445 to identify that a content item corresponding to each designated thumbnail was not previously shared to a content host or sharing service. Some embodiments may identify thumbnail 462 as corresponding to a content item that was last shared or uploaded, for instance, suggesting that an adjacent thumbnail is where a content sharer might next resume sharing.

User interface 410 may include selectable options in dock 480 to switch to other interfaces such as capture 482, favorites 484, albums 486, or search 488. Other exemplary interfaces may incorporate one or more features of user interface 410 such as display of shared status indicators.

Embodiments of user interface 410 may include options such as Sort 406 or Select 404. Some embodiments may use Select 404 to facilitate selecting of one or more content items or thumbnails in order to edit, delete, share, mark as favorite, etc., for example, as depicted in FIG. 2. With user interface 410 depicting a leaf icon 445 to identify that a content item corresponding to each designated thumbnail was not previously shared to a content host or sharing service, a user may readily identify which content items corresponding to marked thumbnails are ready to be shared with, for example, use of Select 404.

A sort option, such as Sort 406, may facilitate sorting content and/or thumbnails by, for example, respective categories or metadata such as date, day, time, location, subject(s), people, colors, and/or other classifications and filters. Embodiments may use machine learning or other image processing to derive data for sorting characteristics and metadata.

Embodiments may sort, e.g., with Sort 406, each content item by share status. An embodiment with Sort 406 may incorporate sorting by one or more types of data, as well as filtering, e.g., by date, time, album or location. In some embodiments, sorting all photographs by share status may not always be practical. For instance, a user interface suggesting to upload an unshared content item from several years ago may not be appropriate or efficient. An embodiment as depicted in scenario 400 may be considered as depicting only recent or fresh content. An embodiment as depicted in scenario 400 may be considered as depicting, for example, photographs taken over a weekend, perhaps at a family reunion.

Figure 4B:
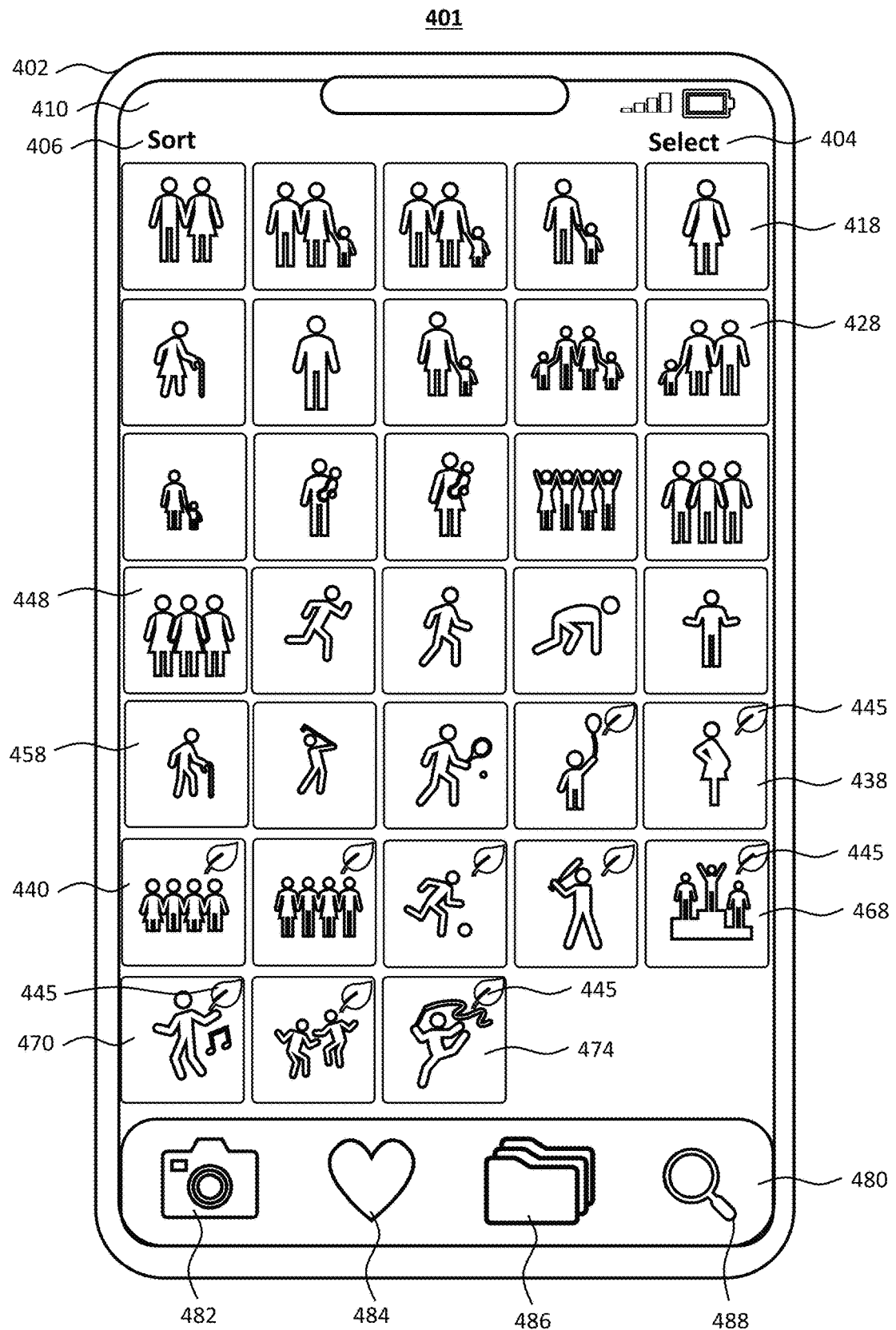
FIG. 4B depicts an illustrative scenario and interface for identifying and displaying content items that have or have not been previously shared, in accordance with some embodiments of the disclosure.

FIG. 4B depicts an illustrative scenario and interface for identifying, sorting, and displaying content items that have or have not been previously shared, in accordance with some embodiments of the disclosure.

An exemplary embodiment is depicted in FIG. 4B as scenario 401 with smartphone 402. Exemplary scenario 401 of FIG. 4B depicts an embodiment featuring exemplary thumbnails of content items with icons indicating whether or not each content item has been previously shared to a social media or content hosting service, with thumbnails representing unshared content items sorted below and to the right of thumbnails representing previously shared content items.

Scenario 401 features a sorted display of scenario 400, depicting a content thumbnail display interface depicted as user interface 410. User interface 410 of scenario 401 includes thumbnails organized by metadata such as day or time, e.g., progressing in time from left to right and top to bottom as depicted in scenario 400, and then sorted by the respective share status. In scenario 401, user interface 401 has each thumbnail with a leaf icon 445 towards the bottom of the interface. For instance, in scenario 400, content corresponding to thumbnail 448 is more recent than content corresponding to thumbnail 440, which is more recent than content corresponding to thumbnail 438, however, in scenario 401, thumbnail 448 is above thumbnail 440 and thumbnail 438, which have a leaf icon 445 to indicate they have not been previously shared to a social media service or content host.

With user interface 410 of scenario 401 sorting thumbnails with a leaf icon 445 to identify that a content item corresponding to each designated thumbnail was not previously shared to a content host or sharing service, a user may readily identify which content items corresponding to marked thumbnails are ready to be shared with, for example, use of Select 404. Embodiments may select all thumbnails with a leaf icon 445 by default or allow a user to input each selection.

Figure 5:
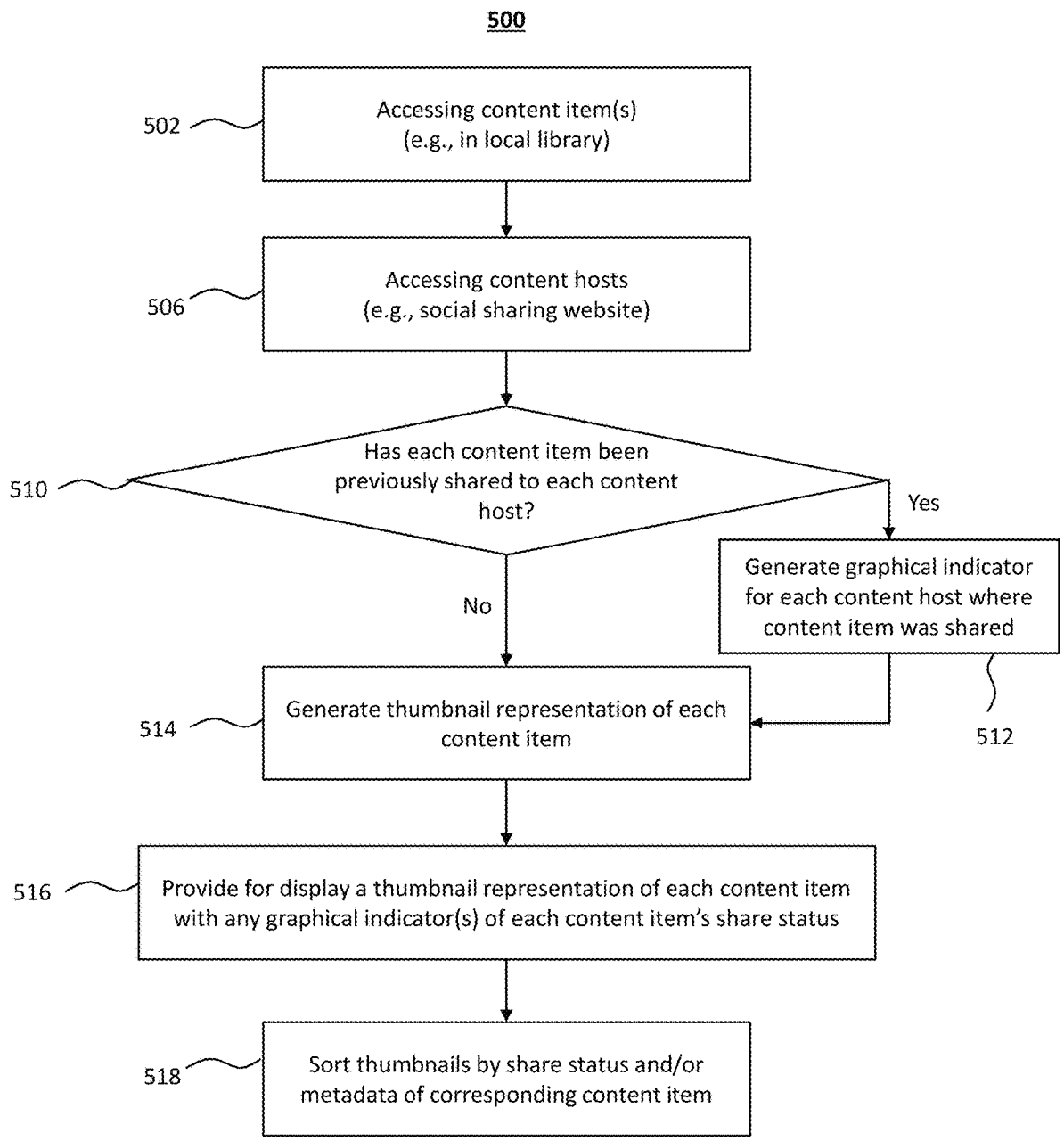
FIG. 5 depicts an illustrative flowchart of a process for identifying and providing for display content items that have or have not been previously shared, in accordance with some embodiments of the disclosure.

FIG. 5 depicts an illustrative flowchart of process 500, a process for marking and providing for display content items that have or have not been previously shared, in accordance with some embodiments of the disclosure. An embodiment may include, for instance, a content marking engine carrying out the steps depicted in the flowchart of FIG. 5.

At step 502, a marking engine accesses one or more content items. In some embodiments, content items may be created or stored locally and/or remotely, e.g., as depicted in FIGS. 8 and 9. At step 502, a marking engine may access one or more content items from, for instance, a local content library.

At step 506, a marking engine accesses one or more content hosts. In some embodiments, content hosts may be social media or content sharing services. In some embodiments, at step 506, a marking engine may access data recorded from previously accessing one or more content hosts.

At step 510, a marking engine determines whether each of one or more content items was previously shared to each of one or more content hosts. In some embodiments, at step 510, a marking engine may access data recorded from previously determining whether each of one or more content items was previously shared to each of one or more content hosts.

If, at step 510, a content item was determined to have been previously shared to a content host then, at step 512, a marking engine generates a graphical indicator for a content item representing each content host where the respective content item was previously shared. In some embodiments, at step 512, a marking engine may access data recorded from previously generated graphical indicators for each content host. In some embodiments, at step 512, a marking engine may access data recorded from previously generated graphical indicators for each content item representing each content host where the respective content item was previously shared.

After step 512, or if, at step 510, a content item was determined to not have been previously shared to a content host, at step 514, a marking engine generates a thumbnail representation of each content item. In some embodiments, at step 514, a marking engine may access data recorded from previously generated thumbnail representations of content items.

At step 516, a marking engine provides for display a thumbnail representation of each content item with any graphical indicator(s) of each content item's share status.

At step 518, a marking engine may sort thumbnail representations by a share status and/or metadata corresponding to each content item.

Figure 6:
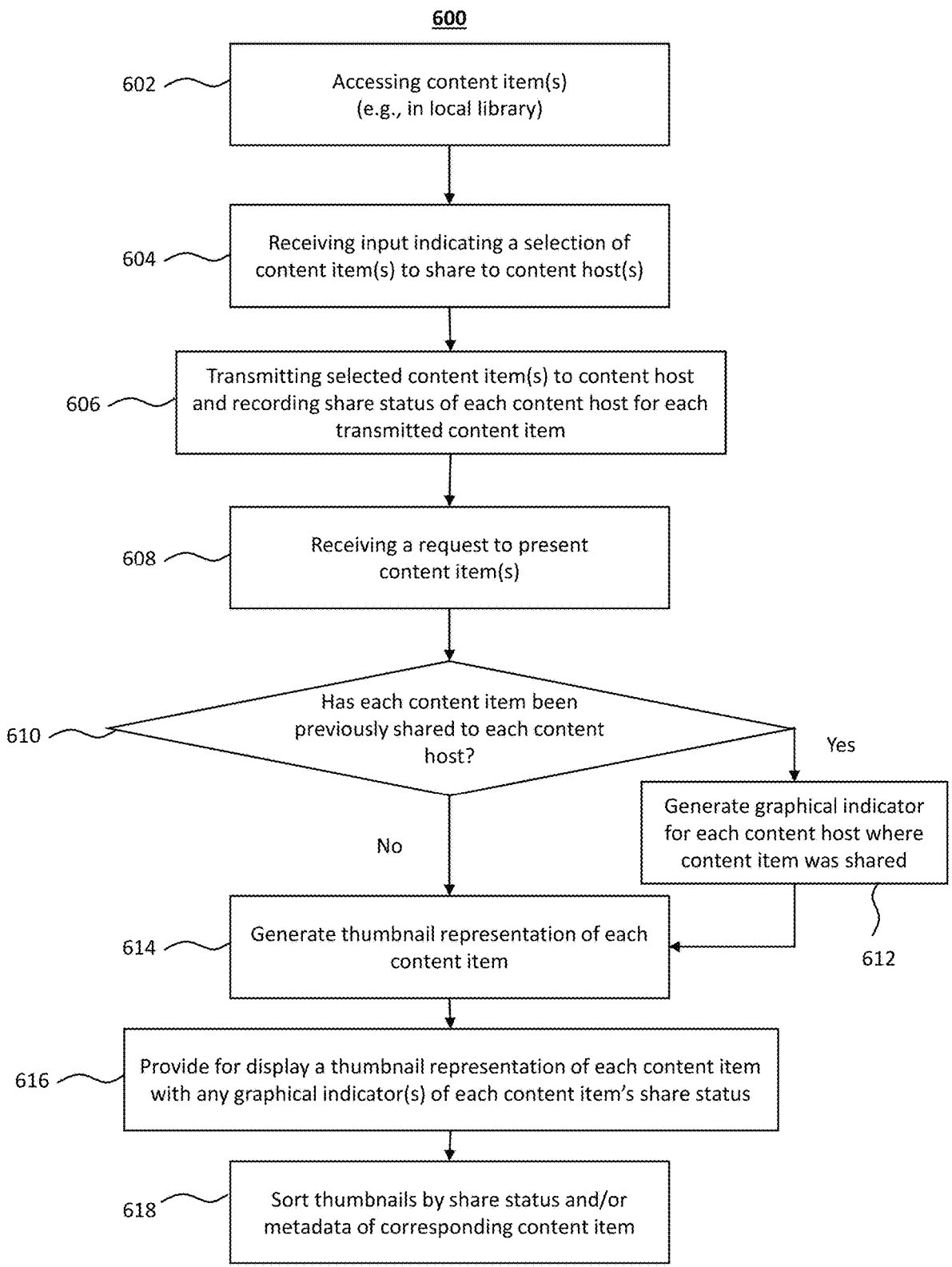
FIG. 6 depicts an illustrative flowchart of a process for identifying and providing for display content items that have or have not been previously shared, in accordance with some embodiments of the disclosure.

FIG. 6 depicts an illustrative flowchart of process 600, a process for marking and providing for display content items that have or have not been previously shared, in accordance with some embodiments of the disclosure. An embodiment may include, for instance, a content marking engine carrying out the steps depicted in the flowchart of FIG. 6.

At step 602, a marking engine accesses one or more content items. In some embodiments, content items may be created or stored locally and/or remotely, e.g., as depicted in FIGS. 8 and 9. At step 602, a marking engine may access one or more content items from, for instance, a local content library.

At step 604, a marking engine receives input indicating a selection of one or more content items to share to one or more content hosts. In some embodiments, content hosts may be social media or content sharing services.

At step 606, a marking engine transmits one or more selected content items to one or more content hosts and records a share status of each content host for each transmitted content item.

At step 608, a marking engine receives a request to present one or more content items. In some embodiments, at step 608, a marking engine may receive a request to present one or more content items from input by a user, for instance, in preparation to view and share content items.

At step 610, a marking engine determines whether each of one or more content items was previously shared to each of one or more content hosts. In some embodiments, at step 610, a marking engine may access recorded share status from step 606.

If, at step 610, a content item was determined to have been previously shared to a content host then, at step 612, a marking engine generates a graphical indicator for a content item representing each content host where the respective content item was previously shared. In some embodiments, at step 612, a marking engine may access data recorded from previously generated graphical indicators for each content host. In some embodiments, at step 612, a marking engine may access data recorded from previously generated graphical indicators for each content item representing each content host where the respective content item was previously shared.

After step 612, or if, at step 610, a content item was determined to not have been previously shared to a content host, at step 614, a marking engine generates a thumbnail representation of each content item. In some embodiments, at step 614, a marking engine may access data recorded from previously generated thumbnail representations of content items. At step 616, a marking engine provides for display a thumbnail representation of each content item with any graphical indicator(s) of each content item's share status.

At step 618, a marking engine may sort thumbnail representations by a share status and/or metadata corresponding to each content item.

Figure 7:
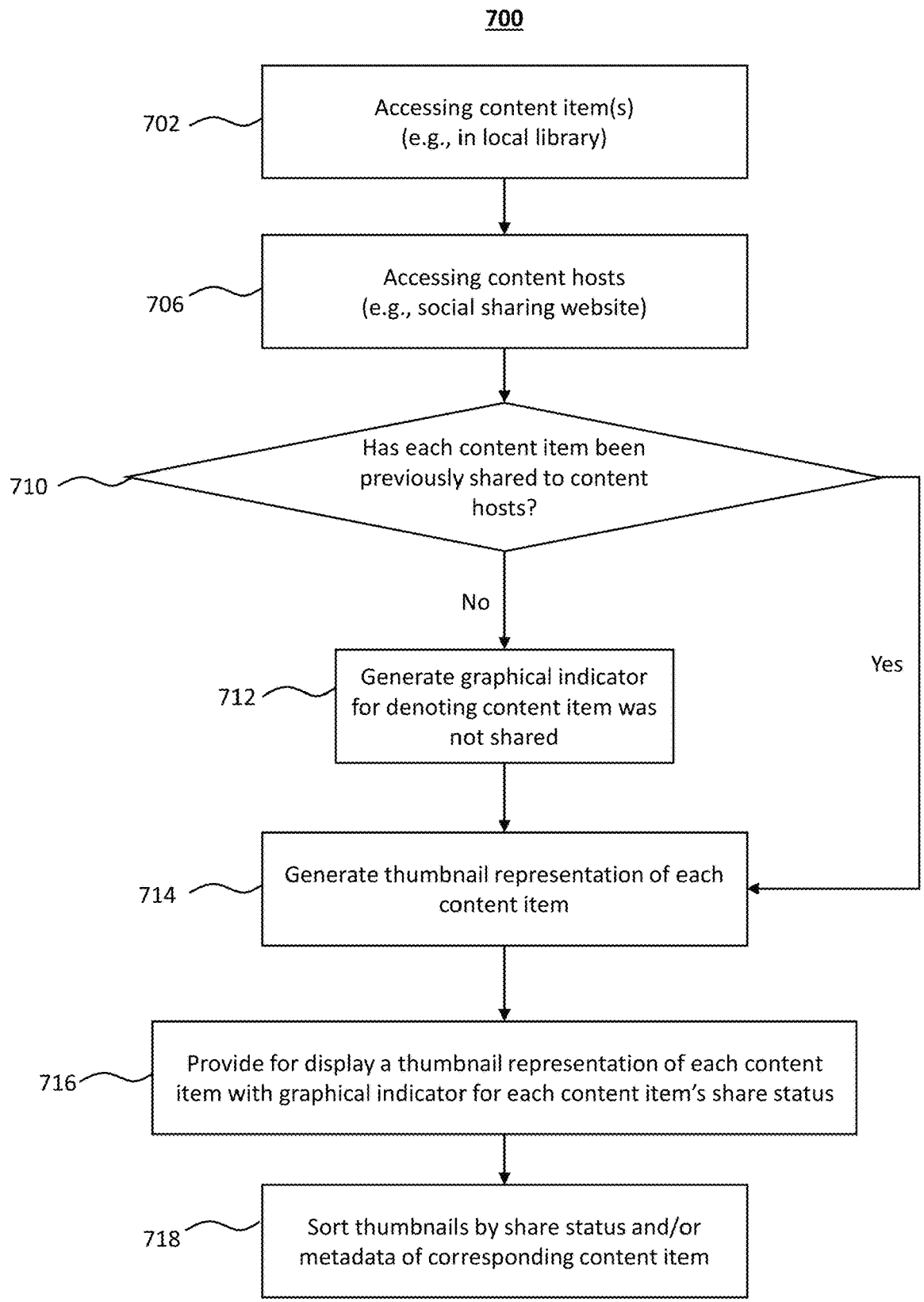
FIG. 7 depicts an illustrative flowchart of a process for identifying and providing for display content items that have or have not been previously shared, in accordance with some embodiments of the disclosure.

FIG. 7 depicts an illustrative flowchart of process 700, a process for marking and providing for display content items that have or have not been previously shared, in accordance with some embodiments of the disclosure. An embodiment may include, for instance, a content marking engine carrying out the steps depicted in the flowchart of FIG. 7.

At step 702, a marking engine accesses one or more content items. In some embodiments, content items may be created or stored locally and/or remotely, e.g., as depicted in FIGS. 8 and 9. At step 702, a marking engine may access one or more content items from, for instance, a local content library.

At step 706, a marking engine accesses one or more content hosts. In some embodiments, content hosts may be social media or content sharing services. In some embodiments, at step 706, a marking engine may access data recorded from previously accessing one or more content hosts.

At step 710, a marking engine determines whether each of one or more content items was previously shared to one or more content hosts. In some embodiments, at step 710, a marking engine may access data recorded from previously determining whether each of one or more content items was previously shared to one or more content hosts.

If, at step 710, a content item was determined to not have been previously shared to a content host then, at step 712, a marking engine generates a graphical indicator for a content item representing that the respective content item was not previously shared. In some embodiments, at step 712, a marking engine may access data recorded from a previously generated graphical indicator. In some embodiments, at step 712, a marking engine may access data recorded from a previously generated graphical indicator for each content item that was not previously shared.

After step 712, or if, at step 710, a content item was determined to have been previously shared to one or more content hosts, at step 714, a marking engine generates a thumbnail representation of each content item. In some embodiments, at step 714, a marking engine may access data recorded from previously generated thumbnail representations of content items. At step 716, a marking engine provides for display a thumbnail representation of each content item with any graphical indicator(s) of each content item's share status.

At step 718, a marking engine may sort thumbnail representations by a share status and/or metadata corresponding to each content item.

FIG. 8 shows a generalized embodiment of illustrative device 800. As referred to herein, device 800 should be understood to mean any device that can receive input and provide content for consumption. As depicted in FIG. 8, device 800 is a smartphone. However, device 800 is not limited to smartphones and may be any computing device. For example, device 800 of FIG. 8 can be implemented in system 900 of FIG. 9 as device 902 (e.g., a smartphone, a smart television, a tablet, a microphone (e.g., with a virtual assistant), a computer, or any combination thereof). Device 800 may also include a content capture component. Content capture component may be any device suitable for creating and/or generating media assets. For example, content capture component may be a camcorder, digital camera, audio recorder, mobile phone, and handheld computing device, or any other device capable of recording and/or storing data. In some embodiments, device 800 may have a front facing camera and/or a rear facing camera.

Device 800 may receive data via input/output (hereinafter I/O) path 802. I/O path 802 may provide received data to control circuitry 804, which includes processing circuitry 806 and storage 808. Control circuitry 804 may be used to send and receive commands, requests, and other suitable data using I/O path 802. I/O path 802 may connect control circuitry 804 (and specifically processing circuitry 806) to one or more communication paths (described below). I/O functions may be provided by one or more of these communication paths but are shown as a single path in FIG. 8 to avoid overcomplicating the drawing.

Control circuitry 804 may be based on any suitable processing circuitry such as processing circuitry 806. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 804 executes instructions for a marking engine stored in memory (i.e., storage 808).

A marking engine may be a stand-alone application implemented on a device or a server. A content curation engine may be a stand-alone application implemented on a device or a server. A marking engine may be implemented as software or a set of executable instructions. The instructions for performing any of the embodiments discussed herein of the marking engine may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 8, the instructions may be stored in storage 808, and executed by control circuitry 804 of a device 800.

In some embodiments, a marking engine may be a client-server application where only the client application resides on device 800 (e.g., device 902), and a server application resides on an external server (e.g., server 906). For example, a marking engine may be implemented partially as a client application on control circuitry 804 of device 800 and partially on server 906 as a server application running on control circuitry. Server 906 may be a part of a local area network with device 902 or may be part of a cloud computing environment accessed via the internet. In a cloud computing environment, various types of computing services for performing searches on the internet or informational databases, providing storage (e.g., content and social media) or parsing data are provided by a collection of network-accessible computing and storage resources (e.g., server 906), referred to as "the cloud." Device 800 may be a cloud client that relies on the cloud computing capabilities from server 906 to determine times, identify one or more content items, and provide content items by the marking engine. When executed by control circuitry of server 906, the marking engine may instruct the control circuitry to generate the marking engine output (e.g., share status, thumbnails, and/or indicators) and transmit the generated output to device 902. The client application may instruct control circuitry of the receiving device 902 to generate the marking engine output. Alternatively, device 902 may perform all computations locally via control circuitry 804 without relying on server 906.

Control circuitry 804 may include communications circuitry suitable for communicating with a marking engine server or other networks or servers. The instructions for carrying out the above-mentioned functionality may be stored and executed on server 906. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the internet or any other suitable communication network or paths. In addition, communications circuitry may include circuitry that enables peer-to-peer communication of devices, or communication of devices in locations remote from each other.

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, or any other suitable fixed or removable storage devices, and/or any combination of the same. Non-volatile memory may also be used (e.g., to launch a boot-up routine and other instructions). Cloud-based storage (e.g., on server 906) may be used to supplement storage 808 or instead of storage 808.

A user may send instructions to control circuitry 804 using user input interface 810 of device 800. User input interface 810 may be any suitable user interface touchscreen, touchpad, stylus and may be responsive to external device add-ons such as a remote control, mouse, trackball, keypad, keyboard, joystick, voice recognition interface, or other user input interfaces. Display 810 may be a touchscreen or touch-sensitive display. In such circumstances, user input interface 810 may be integrated with or combined with display 812. Display 812 may be one or more of a monitor, a television, a liquid crystal display (LCD) for a mobile device, amorphous silicon display, low temperature poly silicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 812. Speakers 814 may be provided as integrated with other elements of user equipment device 800 or may be stand-alone units. An audio component of content displayed on display 812 may be played through speakers 814. In some embodiments, the audio may be distributed to a receiver (not shown), which processes and outputs the audio via speakers 814.

Control circuitry 804 may allow a user to provide user profile information or may automatically compile user profile information for, e.g., one or more social media or content hosting services. For example, control circuitry 804 may monitor content recorded or captured by the user and associate content with user profile information.

As depicted in FIG. 9, device 902 may be coupled to communication network 904. Communication network 904 may be one or more networks including the internet, a mobile phone network, mobile voice or data network (e.g., a 4G or LTE network), cable network, public switched telephone network, Bluetooth, or other types of communication network or combinations of communication networks. Thus, device 902 may communicate with server 906 over communication network 904 via communications circuitry described above. In should be noted that there may be more than one server 906, but only one is shown in FIG. 9 to avoid overcomplicating the drawing. The arrows connecting the respective device(s) and server(s) represent communication paths, which may include a satellite path, a fiber-optic path, a cable path, a path that supports internet communications (e.g., IPTV), free-space connections (e.g., for broadcast or other wireless signals), or any other suitable wired or wireless communications path or combination of such paths.

A user may use various content capture devices, such as camcorders, digital cameras with video mode, audio recorders, mobile phones, and handheld computing devices, to record content. The user can upload content to a content storage service on the cloud either directly, for example, from device 902, e.g., a smartphone, having content capture feature. Alternatively, the user can first transfer the content to a user equipment device 902. The user equipment device storing the content uploads the content to the cloud using a data transmission service on communication network 904. In some embodiments, the user equipment device itself is a cloud resource, and other user equipment devices can access the content directly from the user equipment device on which the user stored the content.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    uploading a first plurality of content items to a first content sharing service, wherein the first plurality of content items were not uploaded to a second content sharing service;
    uploading a second plurality of content items to the second content sharing service, wherein the second plurality of content items were not uploaded to the first content sharing service; and
    providing for simultaneous display a plurality of thumbnails corresponding to each of the first plurality of content items and the second plurality of content items, wherein each of the plurality of thumbnails corresponding to the first plurality of content items has a first share status overlay in a first static position and lacks a second share status overlay in a second static position different from the first static position, and wherein each of the plurality of thumbnails corresponding to the second plurality of content items has the second share status overlay in the second static position and lacks the first share status overlay in the first static position.

2. The method of claim 1 further comprising:
    determining a third plurality of content items to a first content sharing service, wherein the third plurality of content items were not uploaded to the first content sharing service or the second content sharing service; and
    providing for simultaneous display with the plurality of thumbnails a second plurality of thumbnails corresponding to each of the third plurality of content items, wherein each of the second plurality of thumbnails corresponding to the third plurality of content items lacks a second share status overlay in the first static position and the second static position different.

3. The method of claim 1, wherein the providing for simultaneous display further comprises arranging a thumbnail representation of each of the plurality of thumbnails based on metadata associated with each respective content item.

4. The method of claim 3, wherein the arranging is part of a graphical user interface.

5. The method of claim 3, wherein the arranging is based on location information associated with each of the plurality of content items.

6. The method of claim 5, wherein the arranging further includes arranging the plurality of content items with location information describing a substantially similar location.

7. The method of claim 3, wherein the arranging is based on a creation time associated with each of the plurality of content items.

8. The method of claim 7, wherein the arranging further includes arranging the plurality of content items with a corresponding creation time occurring after a predetermined time.

9. A system comprising:
    memory configured to store a first plurality of content items and a second plurality of content items; and
    control circuitry configured to:
        upload the first plurality of content items from the memory to a first content sharing service, wherein the first plurality of content items were not uploaded to a second content sharing service;
        upload the second plurality of content items from the memory to the second content sharing service, wherein the second plurality of content items were not uploaded to the first content sharing service; and
        provide for simultaneous display a plurality of thumbnails corresponding to each of the first plurality of content items and the second plurality of content items, wherein each of the plurality of thumbnails corresponding to the first plurality of content items has a first share status overlay in a first static position and lacks a second share status overlay in a second static position different from the first static position, and wherein each of the plurality of thumbnails corresponding to the second plurality of content items has the second share status overlay in the second static position and lacks the first share status overlay in the first static position.

10. The system of claim 9, wherein the control circuitry is further configured to:
    determine a third plurality of content items to a first content sharing service, wherein the third plurality of content items were not uploaded to the first content sharing service or the second content sharing service; and
    provide for simultaneous display with the plurality of thumbnails a second plurality of thumbnails corresponding to each of the third plurality of content items, wherein each of the second plurality of thumbnails corresponding to the third plurality of content items lacks a second share status overlay in the first static position and the second static position different.

11. The system of claim 9, wherein the control circuitry is further configured to arrange a thumbnail representation of each of the plurality thumbnails based on metadata associated with each respective content item.

12. The system of claim 11, wherein the control circuitry is further configured to arrange as part of a graphical user interface.

13. The system of claim 11, wherein the control circuitry is further configured to arrange based on location information associated with each of the plurality of content items.

14. The system of claim 13, wherein the control circuitry is further configured to arrange the plurality of content items with location information describing a substantially similar location.

15. The system of claim 11, wherein the control circuitry is further configured to arrange based on a creation time associated with each of the plurality of content items.

16. A method comprising:
receiving information describing a first plurality of content items uploaded to a first content sharing service, wherein the first plurality of content items were not uploaded to a second content sharing service;
receiving information describing a second plurality of content items uploaded to the second content sharing service, wherein the second plurality of content items were not uploaded to the first content sharing service; and
providing for simultaneous display a plurality of thumbnails corresponding to each of the first plurality of content items and the second plurality of content items, wherein each of the plurality of thumbnails corresponding to the first plurality of content items has a first share status overlay in a first static position and lacks a second share status overlay in a second static position different from the first static position, and wherein each of the plurality of thumbnails corresponding to the second plurality of content items has the second share status overlay in the second static position and lacks the first share status overlay in the first static position.

17. The method of claim 16 further comprising:
determining a third plurality of content items to a first content sharing service, wherein the third plurality of content items were not uploaded to the first content sharing service or the second content sharing service; and
providing for simultaneous display with the plurality of thumbnails a second plurality of thumbnails corresponding to each of the third plurality of content items, wherein each of the second plurality of thumbnails corresponding to the third plurality of content items lacks a second share status overlay in the first static position and the second static position different.

18. The method of claim 16, wherein the receiving information describing the first plurality of content items uploaded to the first content sharing service comprises receiving the information from the first content sharing service.

19. The method of claim 16, wherein the receiving information describing the second plurality of content items uploaded to the first content sharing service comprises receiving the information from the second content sharing service.

20. The method of claim 16, wherein the providing for simultaneous display further comprises arranging a thumbnail representation of each of the plurality of thumbnails based on metadata associated with each respective content item.

* * * * *